(12) United States Patent
Flexman et al.

(10) Patent No.: US 6,936,651 B2
(45) Date of Patent: Aug. 30, 2005

(54) COMPATIBILITY IMPROVEMENT IN CRYSTALLINE THERMOPLASTICS WITH MINERAL FILLERS

(75) Inventors: Edmund Arthur Flexman, Wilmington, DE (US); Mark Gary Weinberg, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/660,435

(22) Filed: Sep. 11, 2003

(65) Prior Publication Data

US 2004/0116575 A1 Jun. 17, 2004

Related U.S. Application Data

(60) Provisional application No. 60/434,070, filed on Dec. 17, 2002.

(51) Int. Cl.[7] .................................................. C08K 3/10
(52) U.S. Cl. ....................... 524/413; 524/423; 524/425; 524/427; 524/430; 524/437; 524/442; 524/447; 525/492; 525/493; 525/497
(58) Field of Search ............................... 524/413, 423, 524/425, 427, 430, 437, 442, 447, 492, 493, 497

(56) References Cited

U.S. PATENT DOCUMENTS

| | | | |
|---|---|---|---|
| 2,768,994 A | | 10/1956 | MacDonald |
| 3,027,352 A | | 3/1962 | Walling et al. |
| 4,242,251 A | * | 12/1980 | Aishima et al. ............ 523/202 |
| 4,521,488 A | | 6/1985 | Hattori et al. |
| 4,692,480 A | * | 9/1987 | Takahashi et al. .......... 523/218 |
| 4,753,980 A | | 6/1988 | Deyrup |
| 4,804,716 A | | 2/1989 | Flexman |
| 4,886,851 A | * | 12/1989 | Ikenaga et al. ............. 524/425 |
| 4,954,400 A | * | 9/1990 | Collins et al. .............. 428/414 |
| 5,045,607 A | * | 9/1991 | Wissbrun et al. ........... 525/398 |
| 5,115,004 A | * | 5/1992 | Mochizuki et al. ......... 524/107 |
| 5,156,913 A | * | 10/1992 | Collins et al. .............. 428/392 |
| 5,191,011 A | * | 3/1993 | Tajima et al. ............... 524/512 |
| 5,244,946 A | * | 9/1993 | Guest et al. ................... 524/86 |
| 5,510,419 A | * | 4/1996 | Burgoyne et al. ............. 525/98 |
| 5,641,824 A | | 6/1997 | Forschirm |
| 5,731,380 A | * | 3/1998 | Golder ......................... 525/64 |
| 5,859,146 A | * | 1/1999 | Kielhorn-Bayer et al. .. 525/399 |
| 5,886,066 A | * | 3/1999 | Forschirm .................... 523/200 |
| 6,433,106 B1 | * | 8/2002 | Mori et al. .................. 525/399 |

FOREIGN PATENT DOCUMENTS

| | | | |
|---|---|---|---|
| EP | 0 192 356 | | 8/1986 |
| EP | 0 522 180 | | 8/1992 |
| EP | 0 757 078 | | 2/1997 |
| EP | 0 884 364 | | 12/1998 |
| JP | 01170641 | * | 7/1989 |

OTHER PUBLICATIONS

U.S. Appl. No. 10/659,888, Inventor(s): Edmund A. Flexman and Mark G. Weinberg, Title: Compatibility Improvement in Aromatic Polyesters with Mineral Fillers.

U.S. Appl. No. 09/641,149, Inventor(s): Edmund A. Flexman and Mark G. Weinberg, TItle: Toughened, High–Modulus Polyamides.

* cited by examiner

Primary Examiner—Bernard Lipman

(57) ABSTRACT

A composition for forming a crystalline thermoplastic (such as polyacetal) composition for improving compatibility using a ternary blend that includes a mineral filler and elastomer material and an article made therefrom. The mineral filler may be coated or uncoated.

20 Claims, No Drawings

COMPATIBILITY IMPROVEMENT IN CRYSTALLINE THERMOPLASTICS WITH MINERAL FILLERS

This application claims the benefit of U.S. Provisional Application No. 60/434,070 filed Dec. 17, 2002 which is incorporated by reference herein for all purposes as if fully set forth.

CROSS REFERENCE

Cross reference is made to application Ser. No. 60/434072 entitled "Compatibility Improvement in Aromatic Polyesters with Mineral Fillers" being concurrently filed provisionally with the present application and is incorporated herein by reference.

FIELD OF THE INVENTION

The present invention relates to a crystalline thermoplastic composition that exhibits improved compatibility while maintaining or increasing desirable toughness. More particularly, the present invention relates to a composition comprising a crystalline thermoplastic (such as polyacetals), a mineral filler and an elastomeric material.

BACKGROUND OF THE INVENTION

Crystalline thermoplastics such as polyacetals are well known in the art, and are in widespread commercial use, principally in the form of polyoxymethylene (POM) homopolymer and copolymers. Polyoxymethylene homopolymer is generally formed by polymerizing formaldehyde or trioxane, the cyclic ether form of formaldehyde. Copolymers are generally formed by combining formaldehyde or trioxane with various cyclic ethers such as ethylene oxide or 1,3-dioxolane to form a polymer chain having some units with two or more methylene groups directly adjacent to one another, thereby improving the thermal stability over that of the homopolymer. See for example, U.S. Pat. No. 2,768,994, and U.S. Pat. No. 3,027,352.

Polymer-polymer blends of the prior art often comprise soft or elastomeric materials with polyacetal to provide improved toughness. Sometimes this improved toughness is manifested by an increase in resistance to a notched impact, sometimes by an improvement in elongation or falling weight impact, and sometimes by an increased ability for the molded article to be bent without breaking. In order for the soft elastomeric material to toughen the polymer matrix, it must first be dispersed well and into small particles. The small particles must be maintained as small and discrete particles during any subsequent melt processing, such as injection molding. Finally, there must be sufficient adhesion in the solid state to allow energy from an impact or otherwise distorting event to cross the interface from the matrix to the elastomeric particles for them to toughen the part.

Another problem that can occur in the prior art polymer-polymer blends is delamination. Delamination can occur due to the large particles with too little adhesion to the matrix polymer aligning and then fusing into micro sheets of polymer in the high shear regions of the article. These shear regions are typically located just below the surface and immediately downstream from the gate of the injection molded article.

"Compatibility" is an old and broadly used term in polymer blend technology. The meaning of compatibility is often defined by the context in which it is used. Hence, compatibility can vary in meaning from compatible to the naked eye to chemically compatible in that one ingredient will not degrade the other such as would be the case with polyacetal and PVC, to being miscible at the molecular level. For purposes of this application, the term "better or improved compatibility" describes how a polymer blend helps improve toughness or decrease delamination and/or prevent mold deposits from the second phase from being separated out from the matrix and being left on the mold in the form of a deposit after a number of mold shots, the second phase being an elastomer.

Manufacturers and customers of crystalline thermoplastics such as polyacetal compositions and the articles made from these compositions are interested in lower cost and/or improved toughness associated therewith. Thus, it is desirable to provide a crystalline thermoplastic composition (e.g. polymer blends) with improved compatibility, as defined above, with economical polar olefins or using less thermoplastic polyurethanes (TPUs), which are relatively expensive. This improved compatibility including improved or maintained toughness or decreased delamination when applicable, and/or prevention of mold deposits.

The following disclosures may be relevant to various aspects of the present invention and may be briefly summarized as follows:

WO 02/14429 to Weinberg et al. discloses a composition and method for forming a polyacetal composition of molded articles that exhibit desirable combinations of stiffness and impact resistance. The composition contains a mineral filler within a polyoxymethylene matrix but does not contain a second polymer or elastomer phase.

U.S. Ser. No. 09/641,149 to Weinberg et al. discloses a composition and method for forming a polyamide composition of molded articles that exhibit desirable combinations of stiffness and impact resistance. The composition contains a mineral filler within a nylon matrix but does not contain a second polymer or elastomer phase.

U.S. Pat. No. 4,521,488 to Hattori et al. discloses a polyacetal resin composition with heat stability and surface processability which comprises (a) about 100 parts by weight of polyacetal resin, (b) about 2 to about 35 parts by weight of a carbonate, phosphate or acetate of a metal belonging to Group II of the Periodic Table or a mixture thereof and (c) about 0.01 to about 20 parts by weight of a polymer, a copolymer or a mixture thereof of a compound selected from the group consisting of unsaturated polyesters, alkyl esters of acrylic acid or methacrylic acid, amides of acrylic acid or methacrylic acid, triallyl cyanurate, diallyl phthalate, vinyl acetate and divinylbenzene.

U.S. Pat. No. 4,753,980 to Deyrup discloses toughened thermoplastic polyester molding compositions characterized by extraordinary toughness comprising 60–97 weight % of a polyester matrix resin and 3–40 weight % of an ethylene copolymer such as ethylene/methylacrylate/glycidyl methacrylate.

U.S. Pat. No. 5,641,824 to Forschirm discloses a self-lubricating polymeric composition, characterized as a melt blend of a thermoplastic polymer and a lubricating system containing ultra high molecular weight polyethylenes, a polyester, acid metal salts, calcium salts, antioxidants and stabilizers. The composition may be prepared into shaped articles, which exhibit improved surface wear resistance and coefficients of friction.

SUMMARY OF THE INVENTION

Briefly stated, and in accordance with one aspect of the present invention, there is provided a composition comprising a melt blend for improving compatibility containing (a) a matrix material of about 45% to 94.5% by weight of a crystalline thermoplastic; (b) about 0.5% to 30% by weight of mineral filler and (c) about 5% to 25% by weight of an elastomer.

Pursuant to another aspect of the present invention, there is provided a composition comprising a polyacetal polymer with about 0.5%–30%, by weight of a mineral filler, the filler having an average equivalent spherical diameter in the range of 0.05 to less than 4 micrometers, said mineral filler being present in a ratio of about 10% to 300% (e.g. 0.1× to 3× by weight) of the elastomer, the elastomer being in a ratio to the matrix resin of 5% to about 25% by weight.

Pursuant to another aspect of the present invention, there is provided an article made from the composition defined in one of the preceding two paragraphs.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Definitions:

The following definitions are provided as reference in accordance with how they are used in the context of this specification and the accompanying claims.

1. Improved Compatibility: describes how mineral filler in a polymer blend helps improve toughness or decrease delamination and/or prevent mold deposits from the second phase from being separated out from the matrix and being left on the mold in the form of a deposit after a number of mold shots, the second phase being an elastomer.
2. Elastomer: is defined as a soft second phase polymer capable of toughening the POM matrix under certain conditions.
3. For purposes of this application the following legend is provided showing the capital letter that coincides with the description of the materials used in the text and Examples contained herein:

| | |
|---|---|
| A | Acetal copolymer, ASTM Flow Rate of 4.47 grams/10 minutes; manufactured by Asahi Chemical Industry Co., Inc., Tokyo, Japan. |
| B | Acetal homopolymer with a number average molecular weight of ~38,000, manufactured by E.I. du Pont de Nemours & Co of Wilmington, DE. |
| C | Acetal homopolymer with a number average molecular weight of ~63,000, nucleated material; manufactured by E.I. du Pont de Nemours & Co of Wilmington, DE. |
| D | Acetal homopolymer with a number average molecular weight of ~63,000, manufactured by E.I. du Pont de Nemours & Co of Wilmington, DE. |
| E | Poly ethylene/vinyl acetate (EVA) copolymer, 40 weight % vinyl acetate, melt index 56, manufactured by E.I. du Pont de Nemours & Co of Wilmington, DE. |
| F | Methylene disocyanate/butane diol/polybutylene adipate thermoplastic polyurethane (TPU) 24/39/37, inherent viscosity = 1.04 at 0.1% in DMF at 30° C., manufactured by Bayer Inc., Pittsburgh, PA. |
| G | 0.07 microns precipitated calcium carbonate, manufactured by Specialty Minerals Inc., New York, NY. |
| H | 0.07 microns precipitated calcium carbonate, 2 weight % stearic acid coating, manufactured by Speciality Minerals Inc., New York, NY. |
| I | 0.7 microns precipitated calcium carbonate, manufactured by Speciality Minerals Inc., New York, NY. |
| J | 0.7 microns precipitated calcium carbonate, 1 weight % stearic acid coating, manufactured by Speciality Minerals Inc., New York, NY. |
| K | 0.7 microns precipitated calcium carbonate, 2 weight % stearic acid coating, manufactured by Speciality Minerals Inc., New York, NY. |
| L | Ethyl methyl acrylate (EMA), 75/25 weight %, with a melt index of 0.4, manufactured by E.I. du Pont de Nemours & Co of Wilmington, DE. |
| M | Ethylene/butylacrylate/glycidolmethacrylate terpolymer (EBAGMA), 67/28/5 weight %, melt index 15, manufactured by E.I. du Pont de Nemours & Co of Wilmington, DE. |

The present invention, through the incorporation of elastomers or polar olefins into a crystalline thermoplastic (e.g. polyoxymethylene, syndiotatic polystyrene, polyether etherketone (PEEK), polyetherketoneketone (PEKK), and polyphenylene sulfide (PPS)), along with mineral fillers, results in improvements in properties over the prior art polymers. The present invention discloses a ternary composition that includes an elastomer or polar olefin and a mineral filler in addition to the crystalline thermoplastic, to improve compatibility including increasing the toughness of the polymer-polymer blend. The increase in toughness of the ternary composition is a surprising and unexpected result of the present invention. It is believed that the elastomeric material of the present invention, along with the mineral filler causes the desired increase in toughness of the present invention.

In one embodiment of the present invention, the particulate solids such as CaCO3 are able to improve the "compatibility" (as described above) of blends of two or more polymers. In the prior art a binary blend containing mineral filler and a matrix of a crystalline thermoplastic polymer, improves both stiffness and toughness using a mineral filler, as described in WO 02/14429 to Weinberg et al. and U.S. Ser. No. 09/641,149. The present invention improves compatibility and increases the toughness over that of binary composition of polyacetal and elastomers. This improved toughness is believed to be a result of the CaCO3 being encapsulated by the first phase to melt (usually the softer elastomer), and acting to increase the effective volume of rubber. In some instances, the rubber level of the polyacetal composition may be reduced by using the mineral filler to replace a portion of the rubber (e.g. the total rubber volume is decreased while the density is increased) to achieve the desired toughness. In contrast, common binary elastomer/matrix blends usually exhibit decreased toughness when a mineral filler is added.

The composition, of the present invention, also reduces the cost without losing the desired properties (e.g. toughness) by using inexpensive polar olefins. The inexpensive polar olefins are used in place of the more expensive thermoplastic polyurethane (TPU) for toughening, or in place of at least a portion of the TPU, such that less TPU is used while obtaining the same level of toughness. Hence, leading to reduction in the cost of the composition. While the present invention is applicable for other expensive elastomers such as polyether polyester thermoplastic elastomer, the economically preferred elastomers of the present invention include soft ethylenic polymers such as EVA, EMA, and EBAGMA. These soft ethylenic polymers may be copolymers, terpolymers or tetrapolymers.

As mentioned above, the term "better or improved compatibility" in the present invention is used to describe how a polymer blend helps improve toughness or decrease delamination and/or prevent mold deposits. It is believed that toughness is improved in the present invention because the improved compatibility can provide a composition with smaller rubber particles that are known to toughen the composition better than larger rubber particles. Rubber (e.g. elastomer) particles can be too small in some matrices, for instance in nylon 6 or traditional HIPS (high impact polystyrene). Particulate solids can also increase the melt viscosity of a molten polymer as in the dispersed rubber particles in a molten polymer blend. Thus, the filler particles may help prevent coalescence, which is recognized as a cause of large rubber particles, when they are mostly located in the rubber particles (i.e. encapsulated). (The particles size discussed here is described in U.S. Pat. No. 4,804,716 to Flexman and is incorporated by reference in its entirety. Specific reference is made in column 5, line 48 through column 7, line 59 and Table 49). Since one type of toughness, or ductility, is measured by elongation at break, "improved compatibility" can be a subset of the impact toughness improvement since a few large particles often act as stress risers to drastically decrease elongation. This can be seen by the improved Izod values and the elongation values shown in Tables 4 and 9. It is further believed, that the present invention improves compatibility because the particulate solids, in acting like a rubber extender, increase the effective volume of the elastomer in the total system.

Delamination is also improved, in the present invention, by the prevention of phase separation driven by thermodynamics. One mechanism for this is to increase the melt viscosity of the dispersed phase. Delamination of, for example, a polymer blend is the result of the dispersed particles that are too large having insufficient adhesion. (See U.S. Pat. No. 4,804,716 incorporated herein in its entirety. Specific reference is made to Table IV.) This is a macroscopic result of poor compatibility visible to the naked eye. The most significant delamination is often in regions of highest shear, usually on the surface just past the gate of an injection molding. Early manifestations of this phenomenon may look like tiny blisters on the skin of the part. This phenomenon was observed in Example No. 1 of Table 1, in the present application (i.e. delamination occurred) whereas in Examples 2 and 3 of the present invention, in which the CaCO3 was added, no delamination occurred.

Additionally, in the present invention, mold deposit is also prevented which is another result of phase separation of a polymer blend. When a polymer blend without the mineral filler of the present invention is used, the separated portion of the second phase can adhere to the cold wall of the mold and build up causing surface blemishes, partial sticking in the mold, etc.

A comparison test was run in which two resins were run at 215° C. melt and 50° C. mold temperature to compare the mold deposit of the present invention versus prior art. The two resin materials were: 1) 10% TPU (e.g. F) in a polyoxymethylene matrix (e.g. B) and 2) 5% TPU (e.g. F) and 5% CaCO3 (e.g. K) blend in polyoxymethylene matrix (e.g. B). The first material being a prior art binary composition and the second material being a ternary composition of the present invention. Both resins were dried. The materials were run on a machine manufactured by Nissei, model number FN 4000-2, in a one cavity disc tool, having a four (4) inch (10.16 cm) diameter and a ⅛ inch (0.38 cm) thickness. Comparison of the polyacetal blend of 10% TPU versus 5% TPU+5% CaCO3 molding in a ⅛ inch (0.38 cm) thick, four (4) inch (10.16 cm) diameter disk mold with a melt temperature at 215 C, showed the 10% TPU to begin accumulating mold deposit at the $200^{th}$ shot. At 500 shots the mold deposit of the 10% TPU material, covered 30% of the cavity. In contrast, the second material (ternary composition of the present invention) containing 5% CaCO3 and 5% TPU was tougher and showed no mold deposit even after 1000 shots. In a manufacturing process such as injection molding, the longer the machine can run without maintenance (e.g. cleaning the mold of deposits) the more economical and more productive the manufacturing will be. Hence, the present invention reduces mold deposits for reduction/elimination of mold deposits normally present in binary composition molding and thus provides longer machine run time. Thereby, increasing productivity and reducing production costs.

Crystalline thermoplastics such as polyacetal homopolymers, and copolymers formed from two or more aldehyde or cyclic ether monomers are suitable for the practice of the present invention including those which have been nucleated, pigmented, and otherwise modified according to practices common in the art. The polyacetals of this invention may include small amounts of additives, typically less than 5% by weight, which may affect toughness or stiffness, including: stabilizers, antioxidants, mold release agents, lubricants, carbon black, plasticizers, pigments, nucleating agents, higher levels of glass fibers, and other well-known additives commonly employed in the art.

Polyacetals preferred for the practice of the present invention include polyoxymethylene homopolymer, or a copolymer. Preferred copolymers include those formed by copolymerizing according to the teachings of the art formaldehyde or trioxane with cyclic ethers having 2–12 carbon atoms, preferably 1,3-dioxolane. Preferably said alkylene radical repeat units represent no more than 5 mol-%, most preferably not more than 2 mol-%, of the total polymer. Preferred polyoxymethylene copolymers are dipolymers of formaldehyde and ethylene oxide where the quantity of ethylene oxide incorporated into the polymer is about 2 weight percent. The preferred polyoxymethylene homo- and co-polymers for use in the compositions of the present invention are those with a number average molecular weight of about 20,000 to 100,000, more preferably 20,000 to 80,000 and most preferably 25,000 to 70,000. Preferred homopolymers are those whose terminal hydroxyl groups have been end-capped by a chemical reaction to form ester or ether groups, preferably acetate or methoxy groups, respectively according to the teachings in U.S. Pat. No. 2,768,994, op.cit.

Suitable inorganic fillers for use in this invention are those that do not have significant off-gassing or decompose themselves or cause polyacetal to decompose at typical polyacetal processing conditions, including the time-temperature combinations of injection molding. These include, but are not limited to: calcium carbonate; oxides such as alumina, silica, and titanium dioxide; sulfates such as barium sulfate; titanates; kaolin clay and other silicates; magnesium hydroxide, and carbon black. In the present invention, an aspect ratio (the average ratio of the largest to the smallest dimension of the filler particle) of less than about five (5) avoids stress concentrations and part anisotropies. The preferred fillers are calcium carbonate and titanium dioxide. These inorganic fillers can be coated or uncoated. For example, CaCO3 is uncoated in Example 2 in Table 1 but coated with stearic acid, for example in Tables 5–7. While it is believed that the coating helps the rubber to better toughen by allowing cavitation to occur within the rubber particle, in the present invention the ternary composition provides an improvement in toughness whether the inorganic filler is coated or not.

The size of the filler particles listed, in the legend under number 3, in the Definitions section above, is their equivalent spherical diameter. The equivalent spherical diameter is the diameter of a sphere having the same volume as the filler particle and may be determined by use of a Sedigraph 5100 (Micrometrics Instrument Corporation, Norcross, Ga.). The Sedigraph 5100 determines particle size by the sedimentation method, measuring the gravity-induced settling rates of different size particles in a liquid with known properties. The rate at which particles fall through the liquid is described by Stokes' Law. The largest particles fall fastest, while the smallest particles fall slowest. The sedimentation rate is measured using a finely collimated beam of low energy X-rays that pass through the sample cell to a detector. The distribution of particle mass at various points in the cell affects the number of X-ray pulses reaching the detector. This X-ray pulse count is used to derive the particle size distribution expressed as the percent mass at given particle diameters. Since particles rarely exhibit uniform shapes, each particle size is reported as an "Equivalent Spherical Diameter", the diameter of a sphere of the same material with the same speed of sedimentation.

In the present invention, suitable particles have equivalent spherical diameters in the range of about 0.05 to less than about 10 micrometers, preferably 0.05 to less than 4 micrometers, more preferably about 0.05 to 2 micrometers. The size of the filler particles can affect the toughness and/or stiffness properties of the composition of the invention. Particles that are either too large or too small do not produce the benefits of the present invention without causing other harmful effects. A suitable filler particle grade has a relatively narrow size distribution with particular emphasis on having a minimum number of particles much larger than the mean particle size.

Another embodiment of the present invention is to blend together mineral fillers of different particle grades whose average particle size is within the equivalent spherical diameter range specified above.

The present invention is further illustrated by the following specific embodiments, which are not intended to be limiting thereon. The Tables show examples of the resulting data on various composition combinations of the present invention. The ternary combination of elastomer, filler material (e.g. calcium carbonate) and polyacetal improves compatibility (e.g. shown by the increasing toughness (e.g. Izod or elongation)) and reduces delamination over the binary polymer blends of: 1) polyacetal and 2) rubber or elastomeric material.

To attain the results in the Tables that follow, the following experimental procedures were used. The compositions were compounded in a Werner & Pfleiderer 30 mm co-rotating twin screw extruder using a screw design containing two hard working segments comprising of several neutral kneading blocks followed by a reverse element. The barrel temperatures were set at 200° C. and 200 rpm was used. Resin was extruded at 30 pounds per hour.

The extruded pellets were dried overnight at 60° C. and then injection molded in a 6 oz. (0.175 kg), 150 ton Van Dorn injection molding machine equipped with a water-heated mold, into dog-bone shaped tensile bars for tensile testing according to ASTM D-638 (Type I specimen, 2" (5.1 cm) long gauge length; ½" (1.3 cm) wide; ⅛ " (0.38 cm) thick) and flexural test bars (5" (12.7 cm) long, ½" (1.3 cm) wide, ⅛ " (0.38 cm) thick). The moulding machine barrel temperatures were set at 200° C. and the mold temperature was set at 60° C. The Izod results were measured according to ASTM D-256, Method A. The Izod values in the Tables are in terms of ft-lb./in with the J/m value in parentheses. (The conversion to J/m used was 53.4 J/M=1 ft-lb/in.) The elongation in the Tables was determined using the procedure set forth in ASTM D-638.

Table 1 illustrates the ability of two grades of CaCO3 (i.e. G & H) to improve compatibility by increasing toughness (e.g.Izod and elongation) and eliminate delamination in comparison to the control, Example 1, without the mineral filler (CaCO3). The CaCO3 is uncoated in Example 2 and coated in Example 3, as well as in other Examples, for instance, as shown in Tables 5–7. While it is believed that the coating helps the rubber to better toughen by allowing cavitation to occur within the rubber particle, an improvement occurs in toughness, of the present invention, whether the CaCO3 is coated or not.

The delamination (see column marked "delam") reduction was noticed during normal molding and testing of the control Example 1. The delamination reduction is noticeable only on examples in which delamination is a problem.

TABLE 1

| Example No. | Wt. % | MATRIX | Wt. % | RUBBER | Wt. % | Mineral Filler | Filler/ Rubber Ratio | Sample Average IZOD Ft-lb/in (J/m) | Standard Deviation Izod Ft-lb/in (J/m) |
|---|---|---|---|---|---|---|---|---|---|
| Control 1 | 90 | B | 10 | C | 0 | | 0 | 9.5 (507) | 0.4 (19) |
| 2 | 85 | B | 10 | C | 5 | A | 0.5 | 9.1 (486) | 0.5 (27) |
| 3 | 80 | B | 10 | C | 10 | A | 1.0 | 10.4 (555) | 0.7 (39) |
| 4 | 75 | B | 10 | C | 15 | A | 1.5 | 4.5 (240) | 2.7 (143) |

Table 2 shows the ability of another grade of CaCO3 (i.e. K) from those in Table 1, to improve toughness. Furthermore, the level of the added rubber was not high enough to delaminate during molding. (i.e. The delamination is being driven by the disparity in the melt viscosity between the POM and the EVA (E)).

TABLE 2

| Example No. | % | MA- TRIX | % | RUBBER | % | Mineral Filler | % E | IZOD ft-lb/ in (J/m) |
|---|---|---|---|---|---|---|---|---|
| Control 4 | 100 | C | 0 | — | 0 | — | 33 | 2.1 (112) |
| 5 | 95 | C | 5 | E | 0 | — | 45 | 2.4 (128) |
| 6 | 85 | C | 5 | E | 10 | K | 42 | 2.8 (150) |

TABLE 3

Table 3 shows a low concentration (0.5%) of CaCO3 can improve toughness from the control of 2.1 to 2.7 ft-lb/in (112 to 139 J/m).

| Example No. | % | MA-TRIX | % | RUBBER | % | Mineral Filler | % E | IZOD ft-1b/in (J/m) |
|---|---|---|---|---|---|---|---|---|
| Control 7 | 100 | C | 0 | — | 0 | — | 37 | 2.1 (112) |
| 8 | 95 | C | 5 | E | 0 | — | 48 | 2.4 (128) |
| 9 | 94.5 | C | 5 | E | 0.5 | G | 44 | 2.7 (144) |
| 10 | 94 | C | 5 | E | 1 | G | 36 | 2.5 (134) |
| 11 | 93 | C | 5 | E | 2 | G | 44 | 2.5 (134) |
| 12 | 90 | C | 5 | E | 5 | J | 44 | 2.6 (139) |
| 13 | 87.5 | C | 5 | E | 7.5 | J | 41 | 2.5 (134) |
| 14 | 85 | C | 5 | E | 10 | J | 44 | 2.6 (139) |

Table 4 shows the improvement in toughness with acetal copolymer as the matrix of ternary blends (see Example Numbers 19 and 20, present invention) compared to the binary blend (Example Nos. 16 and 17). Example Nos. 16 and 17 do not contain the mineral filler of the present invention. The percent elongation of Example Nos. 19 and 20 are also are also shown greater than the binary Example Nos. 16 and 17.

TABLE 4

| Example No. | % | MA-TRIX | % | Rubber | % | Mineral Filler | % E | Izod ft-1b/in (J/m) |
|---|---|---|---|---|---|---|---|---|
| Control 15 | 100 | A | 0 | — | 0 | — | 29 | 1.21 (65) |
| 16 | 95 | A | 5 | E | 0 | — | 39 | 1.25 (67) |
| 17 | 90 | A | 10 | E | 0 | — | 36 | 1.23 (66) |
| 18 | 90 | A | 0 | — | 10 | K | 26 | 1.14 (61) |
| 19 | 85 | A | 5 | E | 10 | K | 43 | 1.41 (75) |
| 20 | 80 | A | 10 | E | 10 | K | 44 | 1.30 (69) |

Tables 5 and 6 illustrate the improvement in toughness with TPU as the rubber. It is noted in these Tables that a higher Izod was obtained with one-half of the rubber in both sets of data. This illustrates the desirable cost efficiency of the present invention composition. Example No. 23 improves over the control, Example 21, with the addition of the mineral filler K. Example No. 22 is a binary composition with twice the rubber per cent of the control, Example No. 21, which explains the Izod and percent elongation increase over the control. However, relatively speaking the cost savings provided by the ternary composition of Example No. 23 compared to how close the values for Izod and percent elongation are in using a larger quantity of the more expensive rubber element makes the present invention more attractive to customers.

TABLE 5

| Example No. | % | MA-TRIX | % | RUBBER | % | Mineral Filler | % E | IZOD ft-1b/in (J/m) |
|---|---|---|---|---|---|---|---|---|
| 21 | 95 | B | 5 | F | 0 | — | 43 | 1.9 (102) |
| 22 | 90 | B | 10 | F | 0 | — | 47 | 2.0 (107) |
| 23 | 90 | B | 5 | F | 5 | K | 45 | 2.1 (112) |

The following table illustrates CaCO3 (i.e. K) with a 2 weight % stearic acid coating showing an increase in Izod toughness over the binary composition. Similar to Table 5, the ternary composition provides results close to the binary results for percent elongation and toughness. However, the binary composition uses double the amount of rubber and thus is more expensive then the ternary composition of the present invention, while providing comparable physical properties of toughness and elongation for less cost.

TABLE 6

| Example No. | % | MA-TRIX | % | RUBBER | % | Mineral Filler | % E | IZOD ft-1b/in (J/m) |
|---|---|---|---|---|---|---|---|---|
| 24 | 100 | B | 0 | — | 0 | — | 21 | 1.5 (80) |
| 25 | 90 | B | 10 | F | 0 | — | 43 | 2.2 (118) |
| 26 | 90 | B | 5 | F | 5 | K | 41 | 2.4 (128) |

Table 7 illustrates the ability of two grades of CaCO3 (i.e. K and H) to improve the toughness using high molecular weight homopolymer and TPU as the rubber. This ternary composition of Table 7, uses a different polymer matrix then in Tables 5 and 6, which is believed to increase the elongation and toughness as shown therein. The polymer matrix material (i.e. C) of Table 7 is a tougher material and is easier to toughen then the matrix material (i.e. B) of Tables 5 and 6.

TABLE 7

| Example No. | % | MA-TRIX | % | RUBBER | % | Mineral Filler | % E | IZOD ft-1b/in (J/m) |
|---|---|---|---|---|---|---|---|---|
| Control 27 | 90 | D | 10 | F | 0 | — | 47 | 2.5 (134) |
| 28 | 80 | D | 10 | F | 10 | K | 58 | 3.2 (171) |
| 29 | 80 | D | 10 | F | 10 | H | 52 | 2.6 (139) |

Table 8 illustrates that four different grades of CaCO3 (i.e. G, H, K and I) improve the Izod if each are precompounded (i.e. "precomp") at a 1:1 ratio with the rubber prior to blending with the POM matrix. This precompounding is the equivalent of adding the CaCO3 to the rubber in the rear of an extruder and introducing the polyoxymethylene (POM) further down the barrel with a side feeder.

TABLE 8

| Example No. | % | MATRIX | % | RUBBER | % | Mineral Filler or Mineral Filler/RUBBER | % E | IZOD ft-1b/in (J/m) |
|---|---|---|---|---|---|---|---|---|
| Control 30 | 95 | C | 5 | E | 0 | — | 35 | 2.11 (113) |
| 31 | 90 | C | 5 | E | 5 | G | 44 | 1.79 (96) |
| 32 | 90 | C | 0 | precomp.-> | 10 | G/E | 41 | 2.22 (119) |

TABLE 8-continued

| Example No. | % | MATRIX | % | RUBBER | % | Mineral Filler or Mineral Filler/RUBBER | % E | IZOD ft-1b/in (J/m) |
|---|---|---|---|---|---|---|---|---|
| 33 | 90 | C | 5 | E | 5 | H | 44 | 2.29 (122) |
| 34 | 90 | C | 0 | precomp.-> | 10 | H/E | 47 | 2.33 (124) |
| 35 | 90 | C | 5 | E | 5 | I | 43 | 1.75 (94) |
| 36 | 90 | C | 0 | precomp.-> | 10 | I/E | 40 | 2.50 (134) |
| 37 | 90 | C | 5 | E | 5 | K | 46 | 2.42 (129) |
| 38 | 90 | C | 0 | precomp.-> | 10 | K/E | 34 | 2.34 (125) |

Table 9 illustrates the toughness improvement at higher levels of TPU in POM homopolymer. The rubber used in this table is methylene disocyanate/butane diol/polybutylene adipate thermoplastic polyurethane 24/39/37, with inherent viscosity 1.04 at 0.1% DMF at 30 C (i.e. F).

TABLE 9

| Example No. | % | MATRIX | % | RUBBER | % | Mineral Filler | % E | IZOD ft-1b/in (J/m) |
|---|---|---|---|---|---|---|---|---|
| Control 39 | 75 | D | 25 | F | 0 | — | 69 | 5.8 (310) |
| 40 | 70 | D | 25 | F | 5 | K | 68 | 8.2 (438) |
| 41 | 65 | D | 25 | F | 10 | K | 130 | 9.3 (497) |
| 42 | 60 | D | 25 | F | 15 | K | 212 | 9.7 (518) |

Polar olefins are less effective than TPUs in toughening polyacetals in simple binary blends. However, in Table 10, the results show that the presence of the mineral filler in the present invention increases notched impact toughness at the high levels of this rubber even though it is not as effective as other rubbers shown. In addition, Table 10 illustrates that the presence of the mineral filler at its higher levels of 20% and 30% of this rubber also eliminates delamination (i.e. see "delam" in Table 10). In the results of Table 10, it is believed that the possible driving force for delamination due to the incompatibility of this pair of polymers was molding in this mold at these conditions. It appears that the incompatibility was sufficiently great at 20% rubber so that 20% mineral filler was inadequate to prevent delamination (Example No. 46). Thus, 30% mineral filler was required (Example No 47). Example No. 48 with higher rubber (30%) and only 20% mineral filler did not delaminate because phase inversion had occurred.

Table 11 demonstrates how the presence of a mineral filler at the same level of rubber increases its toughness (elongation and Izod) and apparent compatibility (elongation). The % E increased as the mineral filler increased.

TABLE 11

| Example No. | % | MATRIX | % | RUBBER | % | Mineral Filler | % E | IZOD ft-1 b/in (J/m) |
|---|---|---|---|---|---|---|---|---|
| Control 49 | 85 | B | 15 | F | 0 | — | 38 | 2.6 (139) |
| 50 | 70 | B | 15 | F | 15 | K | 77 | 3.0 (160) |
| 51 | 55 | B | 15 | F | 30 | K | 96 | 3.0 (160) |

The examples in Table 12 represent three different groups of examples. Examples 52–55 represent examples run in the same group, Examples 56–59 another group, and Examples 58–60 a third group. Note the values for the percentage of rubber contained in the compositions and the mineral filler. The ternary compositions continue to show that those examples are comparable in toughness and elongation to the binary compositions (e.g. without mineral filler). The three different groups of examples in Table 12 that contain the mineral filler, contain half of the rubber content contained in their respective control examples (52, 56 and 58). This contrasts to the examples in Table 11 where the rubber content is the same between the control and those containing mineral filler, yet the toughness improvements of Table 12 are more evident than that of Table 11.

TABLE 10

| Example No. | % | MATRIX | % | RUBBER | % | Mineral Filler | % E | IZOD ft-1b/in (J/m) | delam |
|---|---|---|---|---|---|---|---|---|---|
| Control 43 | 80 | D | 20 | L | 0 | — | 36 | 1.7 (91) | Y |
| Control 44 | 70 | D | 30 | L | 0 | — | 31 | 1.7 (91) | Y |
| 45 | 70 | D | 20 | L | 10 | K | 20 | 1.8 (96) | Y |
| 46 | 60 | D | 20 | L | 20 | K | 29 | 1.9 (102) | Y |
| 47 | 50 | D | 20 | L | 30 | K | 12 | 2.1 (112) | N |
| 48 | 50 | D | 30 | L | 20 | K | 38 | 8.3 (443) | N |

TABLE 12

| Example No. | % | MATRIX | % | RUBBER | % | Mineral Filler | % E | IZOD ft-1 b/in (J/m) |
|---|---|---|---|---|---|---|---|---|
| Control 52 | 90 | B | 10 | F | 0 | — | 34 | 2.2 (118) |
| 53 | 90 | B | 5 | F | 5 | K | 38 | 2.2 (118) |
| 54 | 88 | B | 5 | F | 7 | K | 41 | 2.2 (118) |
| 55 | 85 | B | 5 | F | 10 | K | 41 | 2.3 (123) |
| Control 56 | 90 | B | 10 | F | 0 | — | 25 | 1.9 (102) |
| 57 | 85 | B | 5 | F | 10 | K | 39 | 1.9 (102) |
| Control 58 | 90 | B | 10 | F | 0 | — | 43 | 2.2 (118) |
| 59 | 90 | B | 5 | F | 5 | K | 41 | 2.4 (128) |
| 60 | 85 | B | 5 | F | 10 | K | 45 | 2.1 (112) |

It is therefore, apparent that there has been provided in accordance with the present invention, a crystalline thermoplastic (such as polyoxymethylene) ternary composition and an article made therefrom containing a mineral filler and an elastomer that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A composition comprising a melt blend containing (a) a matrix material of about 45% to 94.5% by weight of a polyacetal; (b) about 0.5% to 30% by weight of mineral filler having an equivalent spherical diameter of about 0.05 to less than 10 micrometers and (c) about 5% to 25% by weight of an elastomer comprising thermoplastic polyurethane (TPU) or polyether polyester thermoplastic polymers, wherein the weight percentages are based on the total weight of the composition.

2. A composition according to claim 1, wherein the melt blend is (a) a polyacetal of about 90% to 85% by weight (b) about 5% to 10% of mineral filler having an equivalent spherical diameter of about 0.05 to less than 10 micrometers by weight and (c) about 5% to 10% by weight of the elastomer comprising thermoplastic polyurethane (TPU) or polyether polyester thermoplastic polymers, wherein the weight percentages are based on the total weight of the composition.

3. A composition according to claim 1 or 2, wherein the mineral filler is selected from the group consisting of calcium carbonate (CaCO3), oxides, sulfates, titanates, kaolin clay, silicates, magnesium hydroxide, carbon black and combinations thereof.

4. A composition according to claim 3, wherein the oxides are selected from the group consisting of aluminum oxides, silicon oxides, and titanium dioxide (TIO2).

5. A composition according to claim 3, wherein the sulfates are barium sulfate.

6. A composition according to claim 1, wherein the mineral filler is CaCO3 or TIO2.

7. A composition according to claim 1, wherein the mineral filler is CaCO3.

8. A composition according to claim 1, wherein the matrix material is an acetal copolymer.

9. A composition according to claim 1, wherein the matrix material is an acetal homopolymer.

10. A composition according to claim 1 or 2, wherein said mineral filler contains a coating, said coating being a non-aromatic organic acid, a salt, ester, ether, epoxy, or a mixture thereof.

11. A composition according to claim 1, wherein the melt blend is (a) a polyacetal of about 90%–60% by weight, wherein said polyacetal comprises polyoxymethylene; (b) about 5%–20% by weight of mineral filler, wherein said mineral filler comprises CaCO3 or TIO2; and (c) about 5%–20% by weight of the elastomer, wherein said elastomer comprises thermoplastic polyurethane or polyether polyester thermoplastic polymers.

12. A composition according to claim 1, wherein the melt blend is (a) a polyacetal of about 90%–75% by weight, wherein said polyacetal is polyoxymethylene; (b) about 5%–45% by weight of a mineral filler; wherein said mineral filler comprises CaCO3 or TIO2 and (c) about 5%–10% by weight of the elastomer, wherein said elastomer comprises thermoplastic polyurethane or polyether polyester thermoplastic polymers.

13. A composition comprising a polyacetal polymer with about 0.5%–30%, by weight of a mineral filler, the filler having an average equivalent spherical diameter in the range of 0.05 to less than 10 micrometers, and about 5% to 25% by weight of an elastomer, relative to the total amount of elastomer and polyacetal, said mineral filler having an equivalent spherical diameter of about 0.05 to less than 10 micrometers being present in a ratio of about 0.1× to 3× by weight of the elastomer, and wherein the elastomer comprises thermoplastic polyurethane (TPU) or polyether polyester thermoplastic polymers.

14. A composition according to claim 13, wherein the average spherical diameter of said mineral filler is in the range of 0.05 to less than 4 micrometers.

15. A composition according to claim 14, wherein the average spherical diameter of said mineral filler is in the range of 0.05 to 2 micrometers.

16. A composition according to claim 13 or 14 or 15, wherein said mineral filler is a single grade.

17. A composition according to claim 13 or 14 or 15, wherein said mineral filler is a blend of at least two grades.

18. A composition according to claim 16, wherein said mineral filler having a coating of a non-aromatic organic acid, a salt, ester ether, epoxy, or a mixture thereof, at a concentration of at least 0.5% by weight of the mineral filler.

19. An article made from a composition according to claim 1 or 13.

20. A composition according to claim 17, wherein said mineral filler having a coating of a non-aromatic organic acid, a salt, ester, ether, epoxy, or a mixture thereof, at a concentration of at least 0.5% by weight of the mineral filler.

* * * * *